United States Patent [19]

Lampe et al.

[11] Patent Number: 4,861,670

[45] Date of Patent: Aug. 29, 1989

[54] MARINE FOULANT RELEASE COATING

[75] Inventors: Warren R. Lampe, Charlton; Annette A. Moore, Gansevort; Kathleen R. Hartley, Troy, all of N.Y.

[73] Assignee: General Electric Company, Waterford, N.Y.

[21] Appl. No.: 132,379

[22] Filed: Dec. 15, 1987

[51] Int. Cl.$^4$ .............................................. A01N 9/00
[52] U.S. Cl. .................................. 428/447; 106/15.05; 428/457; 428/450
[58] Field of Search ............... 106/15.5; 428/457, 450, 428/447; 427/388.1, 388.5

[56] References Cited

U.S. PATENT DOCUMENTS

| | | |
|---|---|---|
| 3,436,366 | 4/1969 | Modic .................................. 260/37 |
| 3,702,778 | 11/1972 | Mueller et al. ........................ 117/75 |
| 4,025,693 | 5/1977 | Milne .................................. 428/447 |
| 4,080,190 | 3/1978 | Law ........................................ 71/67 |
| 4,298,543 | 11/1981 | Law et al. ......................... 260/429.7 |

*Primary Examiner*—Nancy Swisher

[57] ABSTRACT

An addition cured rubber containing vinyl end-stopped diorganopolysiloxane and vinyl functional silicone resin is disclosed to provide superior durability when applied to a ship's hull as an anti-foulant or foul release coating.

7 Claims, No Drawings

MARINE FOULANT RELEASE COATING

The present invention relates to a silicone coating useful as a marine foulant release coating. More particularly, the present invention relates to a silicone coating which adheres tenaciously to boat hulls in a marine environment, yet which will provide for release of marine foulants.

BACKGROUND OF THE INVENTION

Marine fouling due to pernicious and pestiferous sessile organisms is a problem which reaches from ancient times to the present. One of the first successful anti-fouling compositions put into general use was patented in England in 1854 and comprised a hot mixture of a toxicant, copper sulfate, in yellow soap applied over a primer of rosin varnish and iron powder. Cuprous oxide was first used in a paint for ship's bottoms around 1863.

The most frequently specified toxicants or anti-foulants in early and recent patents are copper, tin, arsenic and mercury and their various compounds. Other materials have been mentioned such as strychnine, atropine, oxides of zinc, lead and antimony, creosote, phenol, metallic silver, iodine, bromine and mixtures of iron, copper and zinc powders.

Of the many patents which have been issued on paints and systems claiming to control fouling, only a few paints have been found effective for limited periods. Of the many anti-fouling compounds suggested for paints and coatings only three groups, namely cuprous compounds, tin and mercury compounds, have been useful, even in limited degree.

The most widely used poison for present day anti-fouling paints is cuprous oxide ($CU_2O$), while it must be noted that cupric oxide (CUO) is useless as an anti-fouling agent. Thus in utilizing cuprous oxide it is necessary to add an anti-oxidizing agent to the paint to prevent atmospheric oxidation to the inactive cupric form. Mercury compounds have also been used to a limited extent although they do not appear to be as effective as copper and are toxic to humans. Recently some tin compounds, notably tributyl tin oxide (TBTO) have been introduced and claimed to be highly effective (some 3 times more effective than copper). However, the cost is more than 10 times the cuprous compounds and the effectiveness drops off rather abruptly as opposed to the tapering effect of copper. Other inorganic compounds such as arsenious oxide, zinc oxide and nickel compounds have proven of little value though recent work with zinc oxide indicates that such is capable of reinforcing the longevity of life effectiveness of copper as an anti-foulant.

Prevention of fouling by use of toxic paint involves maintaining a lethal concentration of poison in the water immediately adjacent to the surface to be protected. There are two major problems which result from such an approach. Firstly, the leaching action of the poison will eventually exhaust the supply and the anti-foulant coating will no longer have any effect. Secondly, these poisons are toxic to humans and are a major source of pollution in busy harbors and in well traveled waterways. The ambient concentration of poison in some harbors is sufficient to prevent all plant growth in the area of the protected hulls.

One solution to the problems of anti-foulant coatings is the development of foulant release coatings, that is, coatings which do not allow the sessile organisms to firmly adhere to the boat hull. The action of foulant release can be combined anti-foulant poisoning action to permit the use of a more slowly leaching toxic agent.

U.S. Pat. No. 3,702,778, discloses the use of silicone rubber as an anti-fouling coating. Peroxide cure rubbers are demonstrated to reduce observable foul with time.

U.S. Pat. No. 4,080,190, discloses tin silicates employed as a binder or as a filler for anti-fouling coatings. The tin silicate can be cured as the coating or pre-cured, comminuted and used as a filler for organic coatings.

It is clear that silicone coatings which have a release action to foul may also have problems with adhesion to the substrate. This is true with prior art silicone anti-foul coatings.

Thus, it is an object of the present invention to produce a silicone anti-fouling coating which has both good release to foul and good adhesion to the substrate.

SUMMARY OF THE INVENTION

Briefly, according to the present invention, there is provided a ship's hull having an outermost coating of a silicone rubber composition comprising:

(1) 100 parts of a liquid vinyl chain-stopped polysiloxane having the formula:

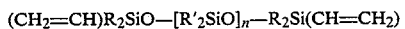

where R and R' are monovalent hydrocarbon radicals free of aliphatic unsaturation, with at least 50 mole percent of the R' groups being methyl and where n has a value sufficient to provide a viscosity of from about 2,000 to 750,000 centistokes at 25° C., preferably from about 50,000 to 150,000, inclusive, (2) from 20 to 50 parts of an organopolysiloxane copolymer comprising where $(R'')_3SiO_{0.5}$ units and $SiO_{4/2}$ units, where R'' is a member selected from the class consisting of vinyl radicals and monovalent hydrocarbon radicals free of aliphatic unsaturation, where the ratio of $(R'')_3SiO_{0.5}$ units to $SiO_{4/2}$ units is from about 0.5:1 to 1:1, and where from about 2.5 to 10 mole percent of the silicon atoms contain silicon-bonded vinyl groups, (3) from 1 to 200 parts of a finely divided inorganic filler which is non-reinforcing for silicone elastomers, (4) a platinum catalyst, (5) an amount of a liquid organohydrogen polysiloxane having the formula:

sufficient to provide from about 0.5 to 1.0 silicon-bonded hydrogen atom per silicon-bonded vinyl group in the composition, where R is as previously defined, a has a value of from 1.00 to 2.00, b has a value of from about 0.1 to 1.0, and the sum of a plus b is from about 2.00 to 2.67, there being at least two silicon-bonded hydrogen atoms per molecule.

DETAILED DESCRIPTION OF THE INVENTION

The compositions of the present invention are described in U.S. Pat. No. 3,436,366 to Modic, hereby incorporated by reference, and are prepared by mixing in a suitable fashion all of the components described above, plus any additional components such as will be described subsequently. Subsequent to mixing, the composition will cure to a silicone rubber, assuming a proper temperature is maintained. The compositions cure at temperatures which vary from room temperature to temperatures of the order of 100° C. or higher, depending upon the particular amount of platinum catalyst present in the composition and depending upon the catalyst present in the composition and depending upon the time which is allowed for the cure. Likewise, the compositions can be prevented from curing by maintaining them at a reduced temperature, such as a temperature of 0° C., in which case all of the components can be kept together for extended periods of time without curing. The compositions can vary from readily flowable liquids to slowly flowing liquids, depending upon the viscosity of the various components employed in the reaction mixture depending upon the amount of filler included in the reaction mixture. Regardless of the flow characteristics of the compositions of the present invention and the proportions of the various ingredients, the compositions cure to a hard, tough silicone elastomer upon maintaining the compositions at the curing temperature for he required amount of time. The compositions are translucent or opaque, depending upon the particular filler employed, and the color of the cured product is a function of the filler and any coloring agents added to the composition.

All of the components of the composition of the present invention are well known in the art. The vinyl chain-stopped organopolysiloxane component (1) is typified by various compositions within the scope of formula (1) where the monovalent hydrocarbon radicals represented by R and R' include alkyl radicals, e.g., methyl, ethyl, propyl, butyl, octyl, etc. radicals; aryl radicals, e.g., phenyl, tolyl, xylyl, etc. radicals; cycloalkyl radicals, e.g., cyclohexyl, cycloheptyl, etc. radicals; aralkyl radicals, e.g., benzyl, phenylethyl, etc. radicals. In the preferred embodiment of the invention, all of the radicals represented by R and R' are selected from the class consisting of methyl and phenyl radials and, in the preferred specific composition, all of the radicals represented by R and R' are methyl.

The organopolysiloxane copolymer which comprises component (2) of the compositions of this invention have been defined as including R" groups which can be vinyl or monovalent hydrocarbon radicals free of aliphatic unsaturation, with at least the stated proportion of the R" groups being vinyl. The R" groups which are not vinyl are of the same scope as the R and R' groups of formula (1) and like these groups, in the preferred embodiment of the invention, all of the monovalent hydrocarbon radicals free of aliphatic unsaturation are preferably methyl groups. The vinyl groups can be present either as a portion of the $(R'')_3SiO_{0.5}$ groups as mentioned or of $(R'')_2SiO$ groups or can be present in both groups.

In general, the various types of siloxane units in copolymer component (2) are selected so that the ratio of the $(R'')_3SiO_{0.5}$ units to the $SiO_{4/2}$ units is between 0.5:1 and 1:1. The $(R'')_2SiO$ units may or may not be present, but are preferably present in an amount equal to from about 0.01:1 to about 0.2:1 based on $SiO_{4/2}$ in the copolymer. Regardless of where the silicon-bonded vinyl groups are located in the copolymer, the silicon-bonded vinyl groups should be present in an amount equal to from about 2.5 to 10.0 mole percent of copolymer component (2).

The copolymer component (2) is a solid, resinous material and is most often available as a solution in a solvent such as xylene or toluene, generally as a 40 to 60 percent by weight solution. For ease of handling the compositions of the present invention, this solution of copolymer component (2) is usually dissolved in some or all of vinyl chain-stopped polysiloxane component (1) and the solvent stripped from the resulting solution to produce a solution of copolymer component (2) in component (1). The proportion of the solution of component (2) is selected so as to give the desired amount of component (2) when the solution is combined with the other components of the composition of this invention.

The finely divided filler component (3) is an optional component and when omitted, the compositions of the present invention cure to transparent silicone rubber. The function of the finely divided filler is not to reinforce the silicone elastomer and, therefore, reinforcing silicone fillers are generally not employed. The main function of the finely divided filler is to act as an extender for the compositions and thus reduce their cost. The effect of the filler in the compositions is generally to increase the hardness of the cured product. The finely divided inorganic fillers which comprise component (4) can include almost any type of finely divided inorganic material, such as ground quartz, titanium dioxide, calcium silicate, ferric oxide, chromic oxide, cadmium sulfide, glass fibers, calcium carbonate, carbon black, lithopone, talc, etc.

The platinum catalyt component (4) employed in the present invention includes all of the well known platinum catalysts which are effective for catalyzing the reaction between silicon-bonded hydrogen groups and silicon-bonded vinyl groups. These materials include the various finely divided elemental platinum catalysts, such as those showin in U.S. Pat. No. 2,970,150—Bailey, the chloroplatinic acid catalyst described in U.S. Pat. No. 2,823,218—Speier, the platinum hyrocarbon complexes shown in U.S. Pat. Nos. 3,159,601—Ashby, and 3,159,662—Ashby, as well as the platinum alcoholate catalysts which are described in U.S. Pat. No. 3,220,972—Lamoreaux. Regardless of the type of platinum catalyst employed, the catalyst is used in an amount sufficient to provide from about $10^{-3}$ t $10^{-6}$ grams atoms of platinum per moleof silicon-bonded vinyl groups in the composition.

The organohydrogenpolysiloxane component (5) is generally a composition of relatively simple molecular structure and is sometimes a mixture of such materials. One characteristic of the organohydrogenpolysiloxane is that it has two silicon-bonded hydrogen atoms per molecule. One of the silicon-bonded hydrogen atoms of the molecule reacts with a silicon-bonded vinyl group of one of the components which comprise component (1) or component (2) and the second silicon-bonded hydrogen atom reacts with another of such silicon-bonded vinyl groups.

One illustration of a specific organohydrogenpolysiloxane compound which can be employed in the practice of the present invention is 1,3,5,7-tetramethylcyclotetrasiloxane, which contains one silicon-bonded methyl group and one silicon-bonded hydrogen atom per silicone atom. Another illustrative material is a dimethylhydrogen chain-stopped dimethylpolysiloxane containing from 2 to 3 silicon atoms in the molecule. A further type of composition is one which comprises a copolymer of dimethylsiloxane units, methylhydrogensiloxane units, and trimethylsiloxane units and which contains from 2 to 5 or 10 or more silicon atoms per molecule. A still further useful type of compound is the compound containing three dimethylhydrogensiloxane units and one monomethylsiloxane unit per molecule. Another useful material is the low viscosity fluid composed of dimethylhydrogensiloxane units and $SiO_{4/2}$ units in the ratio of 2 moles of the former to one mole of the latter. In addition to containing silicon-bonded methyl groups as illustrated in the specific compounds mentioned above, these organohydrogenpolysiloxanes can also contain a variety of other organic groups, even though the preferred materials are those in which all of the R″ groups of formula (2) are methyl. No disadvantage is found in substituting a minor portion of the methyl groups with phenyl groups.

While the compositions of the present invention can be prepared by merely mixing the various components together in any desired fashion as previously described, it is often found most convenient to prepare these compositions in two separate portions or packages which are combined at the time the compositions are to be converted to the solid, cured, elastic state. In the case of the two-package formulation, it is convenient to include in the first package the vinyl chainstopped polysiloxane component (1), the organopolysiloxane copolymer component (2) which has previously been dissolved in some or all of the vinyl chain-stopped polysiloxane, the platinum catalyst component (4) and some or all of the finely divided filler where a finely divided filler component (3) is employed. The second package contains as its sole essential ingredient the organohydrogenpolysiloxane component (5), but as a matter of convenience the second package can also contain a portion of the vinyl chain-stopped polysiloxane component (1) and a portion of any finely divided filler component (3) which is employed.

By adjusting the amount of vinyl chain-stopped polysiloxane fluid component (1) and filler component (3) in the second package, the relative proportions of the two packages required to produce the compositions of the present invention is controlled. Generally, the distribution of the components between the two packages is such that from 0.1 to 1 part by weight of the second package is employed per part of the first package. In selecting the components of the two packages, it is best not to include both the platinum catalyst component (4) and the organohydrogenpolysiloxane component (5) in the same package.

When the two-package system is employed, the two components are merely mixed in suitable fashion at the point of use and the mixture is maintained at the curing temperature until curing has been completed. Generally, complete cure can be obtained at times which vary from 24 hours at room temperature to 10 to 20 minutes at a temperature of about 100° C. The rate of cure is a function of both the concentration of platinum catalyst and the temperature of cure.

Prior to application to an iron, aluminum or fiberglass ship's hull, primer compositions may be applied as appropriate to improve adhesion. The priming composition might be an organic composition such as an acrylic resin. Preferably, it is a silicate ester which may or may not contain conventional adhesion promoter, for instance, gamma-aminopropyl trimethoxysilane. Primer composition should be applied to a thickness of up to a few mils to a clean dry surface and allowed to thoroughly cure.

Application to the hull of the ship may be by spraying, troweling, brushing, or otherwise. Where the silicone rubber is sprayed on, the viscosity must be reduced, generally by dilution with solvent. Viscosity may be somewhat reduced by employing low viscosity inputs as permitted. Generally, the coating thickness should range from about 1 to about 50 mil. The coating should be allowed a cure time of about 24 hours.

Coatings having good foul release as well as an unexpected useful life may be produced as described herein. The Examples given below are given for the purpose of illustrating the present invention. They are not given for any purpose of setting limits or boundaries to the instant invention. All parts in the examples are by weight.

EXAMPLES

Carbon steel panels were sandblasted and coated by brush with a standard corrosion inhibiting paint which was allowed to dry in air overnight. Subsequently, as shown below, there was applied a primer coat by brush of silicate ester solution which was also allowed to dry and cure overnight in air. The silicate ester solution was a partially condensed ethyl silicate in an organic solvent.

To each carbon steel panel was applied and cured a curable silicone coating composition as shown below to a thickness of about 5 to 20 mils. The panels were subsequently submerged in the Panama Canal for a period of 6 months. Upon removal from water the accumulated foul was scoured and the panels evaluated for release of foul and for coating integrity. The coatings tested as are listed in Table 1.

TABLE 1

| Coating | Coatings Tested Description |
|---|---|
| A | Mixture of 80.5 parts 80,000 centipoise vinyl terminated polydimethylsiloxane, 27 parts silicone resin having by number 0.6 $(CH_3)_3SiO_{\frac{1}{2}}/0.085$ $CH_3(CH_2=CH)SiO_{2/2}/1\ SiO_{4/2}$, 50 parts extending filler, 20 ppm of Pt based on linear vinyl polymer in form of Karstedt complex, and 6.75 parts silicone resin having by number 1.33 $H(CH_3)_2SiO_{\frac{1}{2}}/SiO_{4/2}$. |
| B | Mixture of 100 parts 4,000 centipoise silanol terminated polydimethylsiloxane, 62.5 parts extending filler, 3 parts 40% condensed ethylorthosilicate, and 1,000 ppm water. |
| C | Mixture of 100 parts 3,000 centipoise silanol terminated polydimethylsiloxane, 40 parts extending filler, 3 parts 40% condensed ethylorthosilicate, and 750 ppm water. |
| D | Mixture of 93 parts 30,000 centipoise silanol/ t-butoxy stopped polydimethylsiloxane, 24 parts reinforcing filler, 3 parts extending filler, 28.5 parts extending polydimethylsiloxane, 1.6 parts silanol terminated dimethylsiloxane fluid, 2 parts 40% condensed ethylorthosilicate, 0.5 parts tin catalyst and 0.5 parts pigment. |
| E | Mixture of 100 parts silanol terminated polydimethylsiloxane, 3,500 centipoise, 17 parts reinforcing filler, 11 parts liquid resin having $R_3SiO_{\frac{1}{2}}$ units, $R_2SiO_{2/2}$ units and $RSiO_{3/2}$ units, and 7 parts of catalyst mixture containing alkylsilanes, silicates and tin catalyst. |
| F | Mixture of 66 parts methyldimethoxy terminated polydimethylsiloxane, 10 parts reinforcing filler, 18 parts silanol terminated dimethylsiloxane fluid, 2 parts methanol scavenger, 1.4 parts trimethoxysilane, and 0.1 part tin catalyst. |
| G | Mixture of 93 parts 9,000 centipoise silanol terminated polydimethylsiloxane, 129 parts extending filler, 61 parts hydrocarbon solvent, 2 parts titanium dioxide, 2 parts alkyl silane and silicate, 0.2 parts tin catalyst, 4 parts mineral spirits. |
| H | Aquatek coating, obtained commercially and advertised as anti-foulant. |
| I | Miracol 253 coating, obtained commercially and |

TABLE 1-continued

| Coating | Coatings Tested — Description |
|---|---|
| | advertised as anti-foulant. |
| J | Micron 33 coating, obtained commercially and advertised as anti-foulant. |

Table 2 gives results of testing where the performance of each coating is categorized and comparatively force ranked. "Foul Release" compares the coatings upon observation of remaining foul after cleaning. "Coating Integrity" compares adhesion, corrosion break through and overall condition upon observation after cleaning.

TABLE 2

| Coating | Primer Utilized | Foul Release | Coating Integrity |
|---|---|---|---|
| A | Yes | Good-excellent | Excellent[1] |
| B | Yes | Excellent | Excellent |
| C | Yes | Excellent | Good |
| D | Yes | Good | Good |
| E | No | Fair | Fair |
| F | No | Fair | Fair |
| G | No | Poor | Poor |
| H | No | Good | Very Poor[2] |
| I | No | Fair | Very Poor[2] |
| J | No | Good | Very Poor[2] |

[1]Superior in adhesion and corrosion break through as compared to coating B
[2]Over ½ of surface lost during exposure

What is claimed is:

1. A ship's hull normally immersed in sea water and coated with an outermost coating of a curable silicone rubber composition comprising:
   (1) 100 parts of a liquid vinyl chain-stopped polysiloxane having the formula:

$(CH_2{=}CH)R_2SiO—[R'_2SiO]_n—R_2Si(CH{=}CH_2)$ where R and R' are monovalent hydrocarbon radicals free of aliphatic unsaturation, with at least 50 mole percent of the R' groups being methyl and where n has a value sufficient to provide a viscosity of from about 2,500 to 750,000 centistokes at 25° C.,
   (2) from 20 to 50 parts of an organopolysiloxane copolymer comprising $(R'')_3SiO_{0.5}$ units and $SiO_{4/2}$ units, where R" is a member selected from the class consisting of vinyl radicals and monovalent hydrocarbon radicals free of aliphatic unsaturation, where the ratio of $(R'')_3SiO_{0.5}$ units to $SiO_{4/2}$ units is from about 0.5:1 to 1:1, and where from about 2.5 to 10 mole percent of the silicon atoms contain silicon-bonded vinyl groups,
   (3) from 1 to 200 parts of a finely divided inorganic filler which is non-reinforcing for silicone elastomers,
   (4) a platinum catalyst,
   (5) an amount of a liquid organohydrogen polysiloxane having the formula:

$(R)_a(H)_bSiO_{(4-a-b)/2}$ sufficient to provide from about 0.5 to 1.0 silicon-bonded hydrogen atom per silicon-bonded vinyl group in the composition, where R is as previously defined, a has a value of from 1.00 to 2.00, b has a value of from about 0.1 to 1.0, and the sum of a plus b is from about 2.00 to 2.67, there being at least two silicon-bonded hydrogen atoms per molecule.

2. The hull and silicone coating of claim 1 wherein said coating has a thickness of from 0.5 to 40 mil.

3. The hull and silicone coating of claim 1 wherein said silicone coating is coated onto a primed hull to improve adhesion.

4. The hull and silicone coating of claim 3 wherein said primed hull is a dried and cured coating of silcate ester solution on said hull.

5. The hull and silicone coating of claim 1 wherein the viscosity of component (1) is from about 2,500 to 150,000 centipoise at 25° C.

6. The hull and silicone coating of claim 1 wherein said silicone coating is cured.

7. A method for reducing foul on ships comprising the step of coating the ship's hull with a outermost coating of a curable silicone rubber composition comprising:
   (1) 100 parts of a liquid vinyl chain-stopped polysiloxane having the formula:

$(CH_2{=}CH)R_2SiO—[R'_2SiO]_n—R_2Si(CH{=}CH_2)$ where R and R' are monovalent hydrocarbon radicals free of aliphatic unsaturation, with at least 50 mole percent of the R' groups being methyl and where n has a value sufficient to provide a viscosity of from about 2,500 to 750,000 centistokes at 25° C.,
   (2) from 20 to 50 parts of an organopolysiloxane copolymer comprising $(R'')_3SiO_{0.5}$ units and $SiO_{4/2}$ units, where R" is a member selected from the class consisting of vinyl radicals and monovalent hydrocarbon radicals free of aliphatic unsaturation, where the ratio of $(R'')_3SiO_{0.5}$ units to $SiO_{4/2}$ units is from about 0.5:1 to 1:1, and where from about 2.5 to 10 mole percent of the silicon atoms contain silicon-bonded vinyl groups,
   (3) from 1 to 200 parts of a finely divided inorganic filler which is non-reinforcing for silicone elastomers,
   (4) a platinum catalyst,
   (5) an amount of a liquid organohydrogen polysiloxane having the formula:

$(R)_a(H)_bSiO_{(4-a-b)/2}$ sufficient to provide from about 0.5 to 1.0 silicon-bonded hydrogen atom per silicon-bonded vinyl group in the composition, where R is as previously defined, a has a value of from 1.00 to 2.00, b has a value of from about 0.1 to 1.0, and the sum of a plus b is from about 2.00 to 2.67, there being at least two silicon-bonded hydrogen atoms per molecule.

* * * * *